(12) United States Patent
Clark et al.

(10) Patent No.: US 6,442,588 B1
(45) Date of Patent: Aug. 27, 2002

(54) METHOD OF ADMINISTERING A DYNAMIC FILTERING FIREWALL

(75) Inventors: Neal Henry Clark, Fair Haven; Charles Russell Szelag, Colts Neck; Jack Stephen Veenstra, South Plainfield; John Yannacci, Jamesburg, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/137,009

(22) Filed: Aug. 20, 1998

(51) Int. Cl.[7] .............................................. G06F 13/00
(52) U.S. Cl. ........................ 709/203; 709/219; 709/246
(58) Field of Search ................................. 709/227, 228, 709/229, 225, 200, 201, 203, 217, 218, 219, 246

(56) References Cited

U.S. PATENT DOCUMENTS

| | | | | |
|---|---|---|---|---|
| 5,416,842 A | * | 5/1995 | Aziz | 380/30 |
| 5,524,254 A | * | 6/1996 | Morgan et al. | 709/245 |
| 5,828,844 A | * | 10/1998 | Civanlar et al. | 709/228 |
| 5,845,070 A | * | 12/1998 | Ikudome | 380/25 |
| 5,845,267 A | * | 12/1998 | Ronen | 705/40 |
| 5,862,339 A | * | 1/1999 | Bonnaure et al. | 709/227 |
| 5,881,234 A | * | 3/1999 | Schwob | 709/219 |
| 5,974,453 A | * | 10/1999 | Andersen et al. | 709/220 |
| 5,983,273 A | * | 11/1999 | White et al. | 709/229 |
| 6,006,268 A | * | 12/1999 | Coile et al. | 709/227 |
| 6,073,172 A | * | 6/2000 | Frailong et al. | 709/222 |
| 6,092,110 A | * | 7/2000 | Maria et al. | 709/225 |
| 6,233,616 B1 | * | 5/2001 | Reid | 709/225 |
| 6,237,040 B1 | * | 5/2001 | Tada | 709/246 |
| 6,243,832 B1 | * | 6/2001 | Eckes et al. | 714/33 |

* cited by examiner

*Primary Examiner*—Moustafa M. Meky (57) ABSTRACT

A method of permitting a subscriber access to an online server complex operated by a particular online service provider (OSP) is disclosed. An IP communication request comprised of a destination IP address and an origination IP address is received. The IP communication request is forwarded to a dynamic filtering firewall if the destination IP address corresponds to a service provided by the particular OSP. The origination IP address is compared with a table of stored authenticated IP addresses. The IP communication request is forwarded to the destination IP address if the origination IP address matches an IP address contained in the table.

6 Claims, 8 Drawing Sheets

METHOD OF ADMINISTERING A DYNAMIC FILTERING FIREWALL

TECHNICAL FIELD

The present invention is directed to a method of administering a firewall which acts as a filter for determining access to an online service provider network, and more particularly, to a method of administering a firewall for preventing unauthorized access by a user to an online service provider network which can be dynamically updated and maintained.

BACKGROUND OF THE INVENTION

Today, many people use personal computers both at their place of work and in their homes. These computers are used for many purposes including word processing, maintaining account and inventory records, playing games and educational enrichment. As a result of the popularity of personal computers, the cost of owning a computer has gone down making them more affordable.

The general availability of personal computers has spawned the popularity of the Internet and other marketed online services. Files or other resources on computers around the world may be publicly available to users of other computers through the collection of networks known as the Internet. The collection of all such publicly available resources, linked together using files written in Hypertext Mark-up Language ("HTML"), is known as the World Wide Web ("web").

A user of a computer that is connected to the Internet may cause a program known as a client to request resources that are part of the web. Server programs then process the requests to return the specified resources. A standard naming convention has been adopted, known as a Uniform Resource Locator ("URL"). This convention encompasses several types of location names, presently including subclasses such as Hypertext Transport Protocol ("http"), File Transport Protocol ("ftp"), gopher and Wide Area Information Service ("WAIS").

The various resources accessible via the web are created and maintained by many different people on servers located all around the world, and may be created for many different purposes. Many individuals and businesses now have their own web sites that can be visited by people "surfing" the web. These web sites typically provide information on a myriad of subjects such as sports, business, news and even community events.

Online Service Providers (OSPs) provide access to the Internet by providing software to a user which allows the user to access the Internet via Points of Presence (POPs) which are typically operated and maintained by the OSP. When a user wishes to access the Internet, the user invokes a command that causes the computer, via a modem, to dial into the POP. The POP requests a user identification and password that is verified by the OSP. The POP then acts as a gateway to provide the user access to the Internet.

Many OSPs also provide additional online services or subscription services that are particular to that OSP such as, but not limited to, email, news, telephone, chat rooms and personal web pages and are available to those users who subscribe to the services. When the user is authenticated for access to the Internet, the user is also authenticated for access to these subscription services. Such services are commonly incorporated into the price that the OSP charges the user for subscribing to the service. It is to be understood that the terms "user" and "subscriber" may be used interchangeably throughout the description of the present invention and refer to a person who is accessing the Internet or other online service via a particular OSP.

Because a user generally connects to the OSP via the telephone network, the availability of a local telephone number is a crucial consideration to a potential subscriber of the OSP. Since many subscribers spend a significant amount of time on the Internet, an incremental cost of a telephone call to connect to the OSP can be considered to be prohibitive. As such, OSPs usually employ multiple POPs to solicit the maximum number of subscribers to their service.

In order to extend accessibility to a particular OSP, it may be necessary to increase the number of POPs available to that OSP. One such way to accomplish this is to have a third party provide POPs which are then able to provide dial access to the OSP's proprietary online services. However, the third party OSP may also provide dial access to subscribers of other OSPs. As described above, because each OSP typically provides customized online services in addition to access to the Internet, it is important that the third party POP be able to distinguish between different OSP subscribers and to only allow access of OSP specific services to subscribers of that particular OSP.

One way in which to ensure that access to different OSPs are restricted is to dedicate a limited number of Internet Protocol (IP) addresses within the total number of IP addresses available to the third party to each particular OSP. However, this creates an artificial restraint on the availability of IP addresses which could result in delays in gaining access to a particular online network.

SUMMARY OF THE INVENTION

In accordance with the present invention, a method of administering a firewall for preventing unauthorized access by a user to an OSP network which can be dynamically updated and maintained is disclosed. A firewall is a specialized filter that is used to provide security for a network, usually in an Internet protocol based network. The dynamic filtering firewall of the present invention allows two or more OSPs to make efficient re-use of scarce IP addresses and scarce resources. Information packets that are considered authorized to enter or egress an OSP protected network are either proxied by the firewall or allowed to pass through the firewall unchanged. Unauthorized packets are dropped.

The present invention allows for the dynamic assignment of IP addresses to subscriber end-users without requiring a second login to a firewall server. The firewall maintains a real-time, dynamic view of currently authenticated OSP network subscribers. Each authenticated subscriber is added to the list of authenticated subscribers contained in one or more tables of the firewall. The firewall is transparent to the subscriber in that the subscriber is unaware of what entity is controlling the subscriber's access to the OSP network. Upon logging off the system, that subscriber is subsequently removed from the list.

BRIEF DESCRIPTION OF THE DRAWINGS

In the drawings, where like numerals refer to like elements throughout the several views.

DETAILED DESCRIPTION OF THE INVENTION

Figure 1:
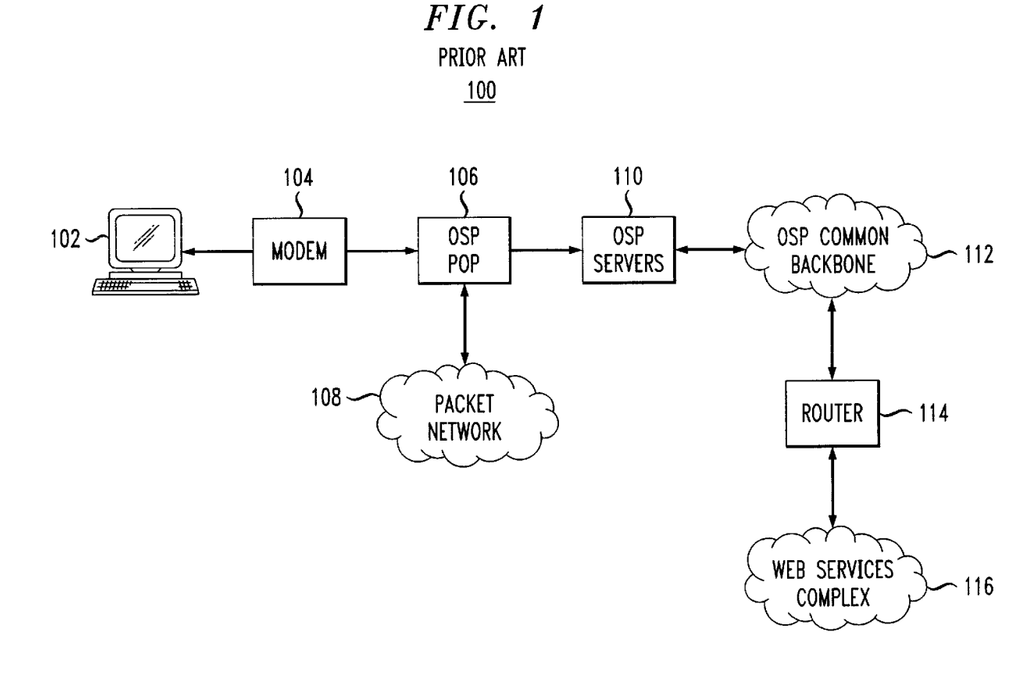
FIG. 1 is a simplified diagram of an exemplary prior art system.

For purposes of illustration, FIG. 1 is a simplified diagram of an exemplary prior art system 100 which may be employed by a user desiring to gain access to one or more online services. For example, the user may wish to access a web site identified by a particular URL or an email account which has been established with the OSP.

Using a personal computer (PC) 102, a user establishes a connection with an Online Service Provider (OSP) Point of Presence (POP) 106. Typically, a modem 104 is used to connect the PC 102 to a particular OSP POP 106 in a conventional manner. In general, the OSP provides the user with a list of telephone numbers that correspond to various POPs established at various geographical locations. The user will typically identify the telephone number corresponding to the POP which is physically closest to his geographical location and use that telephone number to connect to that particular OSP POP. The OSP POP 106 may illustratively, be a server connected to the packet network 108.

Once the user has connected to the OSP POP 106, the user will be asked for his user identification (ID). Once the user ID and password are authenticated by the OSP server 110, the user can access any of the online services for which he is a subscriber. This will typically include access to a packet network 108, such as, but not limited to, the Internet or an Intranet. The packet network 108 may comprise a single packet network or a multiplicity of packet networks, such as, e.g., the "backbone" networks comprising the Internet. The user may also access services which are specific to the OSP and which are accessible via a web services complex 116. The web services complex 116 hosts the OSPs content servers which control the online services which are specific to that particular OSP and for which subscription to those services is usually required. Such subscription usually results in a charge to the subscriber. It is to be understood by those skilled in the art that one or more web services complexes 116 may be maintained by the OSP in order to provide the online services offered by that OSP. Furthermore, the web complex servers 116 may be colocated at a particular geographical location or may be geographically disbursed.

Figure 2:
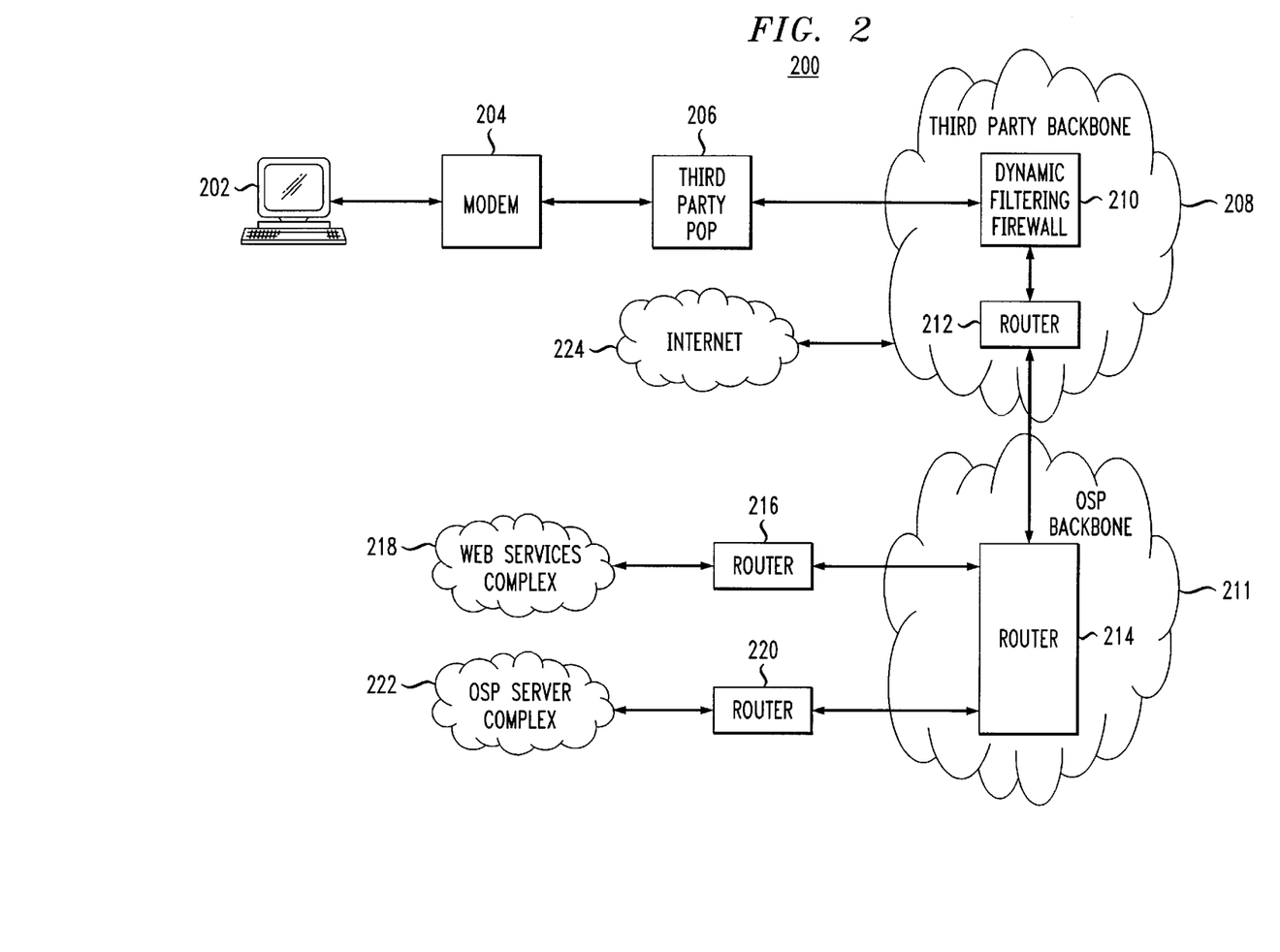
FIG. 2 is a simplified diagram of an exemplary system embodying the invention.

FIG. 2 is an exemplary diagram of a system 200 which may be used to gain access to online services in accordance with the present invention. Using a personal computer (PC) 202, a user establishes a connection with a third party POP 206. The third party POP is operated by a third party and used by one or more OSPs to gain access to their networks. Typically, a modem 204 is used to connect the PC 202 to a particular third party POP 206 which is physically closest to the geographical location of the user. Usually this results in a local telephone call which is least costly to the user. In most cases, the user will be unaware that the POP is not operated by the OSP and the process described below will be transparent to the user.

The PC 202 dials into the OSP via a logical network interface (not shown). The logical network interface may be a local area network (LAN), a Serial Line Internet Protocol (SLIP) connection over a modem, an ISDN port or via a connection to a special LAN such as an ATM LAN or a LAN that offers bandwidth reservation.

Once the user has connected to the third party POP 206, the user will be allocated an Internet Protocol (IP) address from a pool of IP addresses which are allocated to the third party. The third party shares this pool of IP addresses among the various Internet Service Providers (ISPs) and OSPs which utilize the third party for dial access. When a user completes his session and disconnects from the third party POP, the IP address is reused by another user who may or may not be a subscriber to the same OSP as the previous user.

The user is asked for his user ID and password. The user ID and password can be any combination of alphanumeric characters which are dictated by the OSP and can be entered by the user in any conventional manner including, but not limited to, typing the characters via a keyboard or speaking the characters into a microphone.

The user ID and password are received by the third party POP 206 and routed via a third party router 212 located in the third party backbone network 208 to an OSP router 214 located in the OSP backbone network 211. The OSP router 214 routes the user ID and password to an OSP server complex 222 for authentication.

Once the user ID and password are authenticated, a message is communicated to the third party router 212 that the user has been authenticated and an IP address is assigned to that user. The message is also communicated to a dynamic filtering firewall (DFF) 210. The DFF 210 is preferably maintained in a processor such as, but not limited to, a Sun Sparc 20 workstation. The DFF 210 is a specialized filter that is used to provide security for the OSP network. The DFF 210 includes memory in which the user ID, and current IP address assigned to the user is stored so that the user can gain access to proprietary services offered by the OSP and maintained in the OSP server complex 222. It is to be understood by those skilled in the art that the OSP server complex 222 may be comprised of one or more servers which may be co-located at a single location or geographically distributed.

The DFF 210 acts as a barrier to prevent unauthorized access to the OSP subscription services such as, but not limited to, email, news and personal web pages. The DFF 210 maintains a dynamic table of currently authenticated OSP end-user IP addresses that are connected through the third party's dial access network. Any third party originated Transmission Control Protocol (TCP) connection requests directed toward the OSP server complex 222 is screened by the DFF 210 to determine if access will be permitted. Likewise upon disconnection, a user ID and IP address is removed from the DFF 210. Access to non-subscription services such as the Internet 224 are permitted without having to access the DFF 210.

The DFF 210 intercepts IP packets transmitted by the users. When synchronous IP packets are received and detected by the DFF 210, a higher level process is performed which compares the synchronous packets to one or more state tables contained in the DFF 210 which store the IP addresses assigned to the authenticated users.

Figure 3:
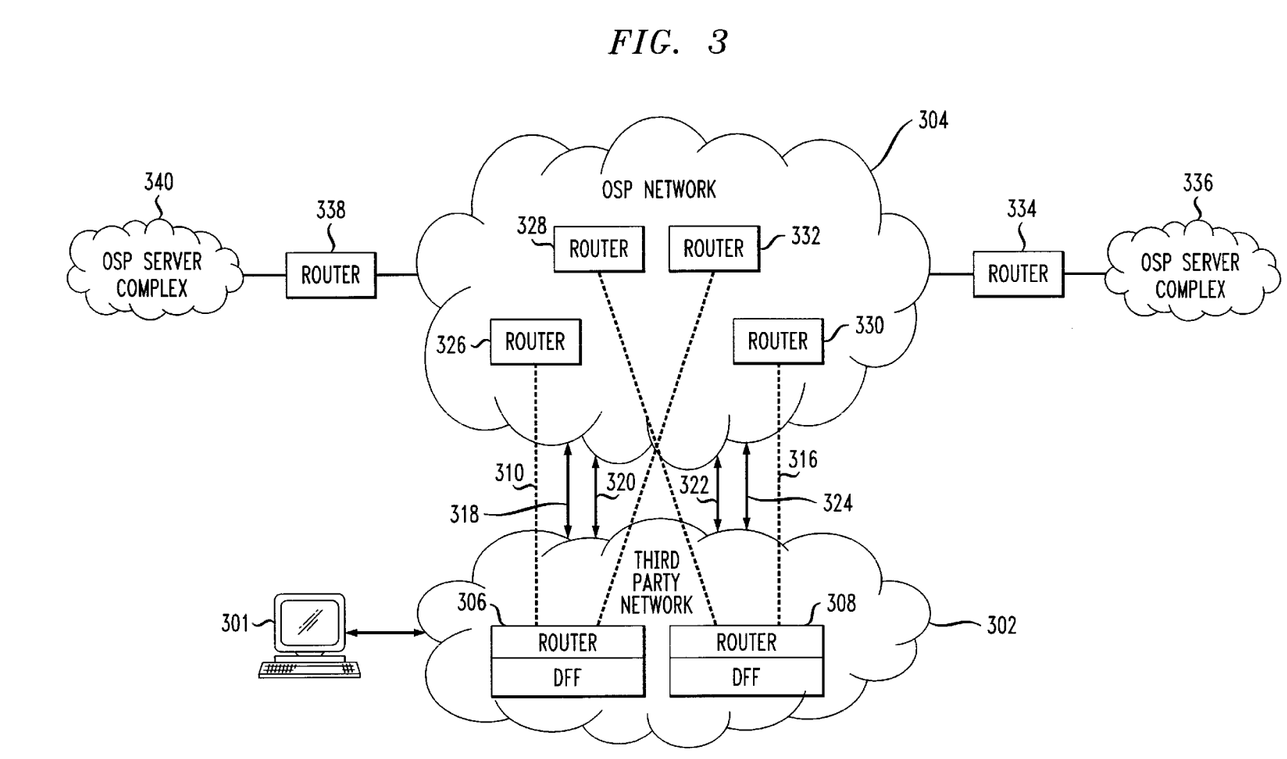
FIG. 3 is a further simplified diagram of the system shown in FIG. 2 which illustrates the virtual connections between the third party network and the OSP network.

FIG. 3 illustrates a further simplified diagram of FIG. 2 which shows the virtual connections between the third party network 302 and the OSP network 304. Third party originated requests are able to reach the OSP server complexes 336, 340 by forcing all requests from the third party pool of IP addresses through a virtual connection which is referred to as a Generic Router Encapsulation (GRE) tunnel 310, 312, 314, 316. A GRE tunnel is a tunneling protocol that encapsulates any IP traffic between the tunnel endpoints within special tunnel IP packets. Tunneling allows for the creation of separate OSP routing domains while sharing the same physical third party facilities used by other OSP routing domains. This results in transparent, secure and efficient use of the T3 facilities 318, 320, 322, 324 that exist between the OSP network 304 and the third party network 302.

The GRE tunnels 310, 312, 314, 316 span from the third party network 302 to the edge of the OSP server complexes 336, 340. A route to the OSP server complexes 336, 340 is advertised through the tunnels 310, 312, 314, 316 to the third party network 302. This advertisement causes the OSP server complexes 336, 340 to be visible to an OSP user 301 connected to the third party dial access network 302.

Any requests directed to the OSP server complexes 336, 340 are routed into one of the GRE tunnels 310, 312, 314, 316 and then tunneled through the OSP network 304 to the OSP server complexes 336, 340. The encapsulation of the IP traffic to the protected OSP server complexes 336, 340, inside of IP packets with addresses normally accessible between the third party and the OSP, allows the traffic to bypass the filters that would normally block any traffic. In one embodiment of the invention, a 20 byte per packet overhead is incurred for traffic passing through the GRE tunnels 310, 312, 314, 316. Return traffic, including data downloaded from the OSP server complexes 336, 340, is routed via the non-tunneled T3 paths 318, 320, 322, 324. Return traffic from the Internet 224 (FIG. 2) is routed directly to the third party network 211 and never passes through the OSP network 209.

As illustrated in FIG. 3 a pair of GRE tunnels 310, 312 and 314, 316 is set up between the two tunnel routers 306, 308 in the third party network 302 and tunnel router pairs 326, 328 and 330, 332 located at each of the OSP access/egress points 338 and 334 respectively to provide redundancy. It is to be understood by those skilled in the art that additional tunnels could be included to provide additional redundancy or to support additional traffic if the traffic levels so warranted. Likewise, while two access/egress points are shown in FIG. 3, the present invention can support any number of access/egress points and such illustration should not be deemed to limit the scope of the invention. The routers used by either the third party or the OSP can be any type of router which is sufficient to support GRE tunneling and the transmission of IP traffic such as routers manufactured by Cisco Corp.

Figure 4A:
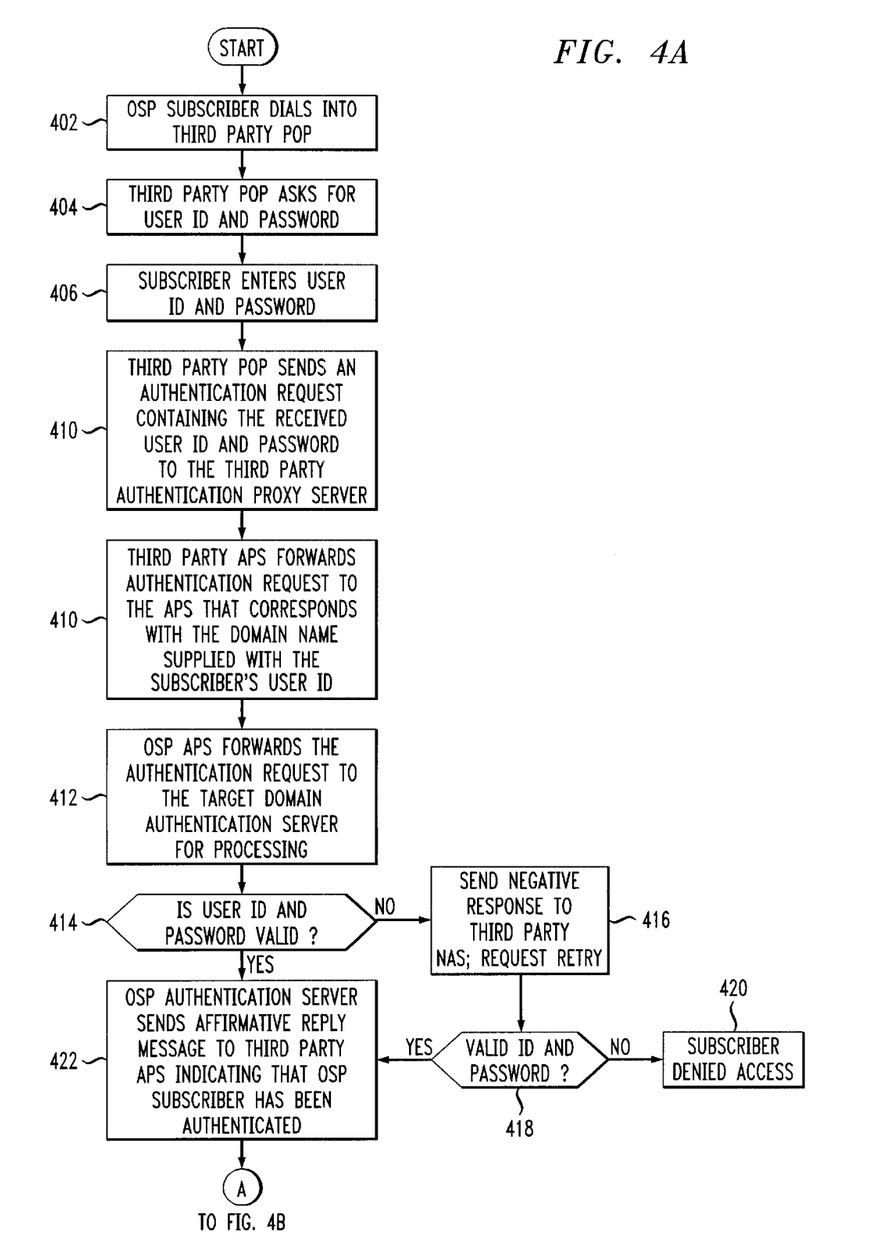
FIGS. 4A and 4B illustrate a flow chart depicting a method of authenticating a user to an OSP subscription service in accordance with the present invention.
Figure 4B:
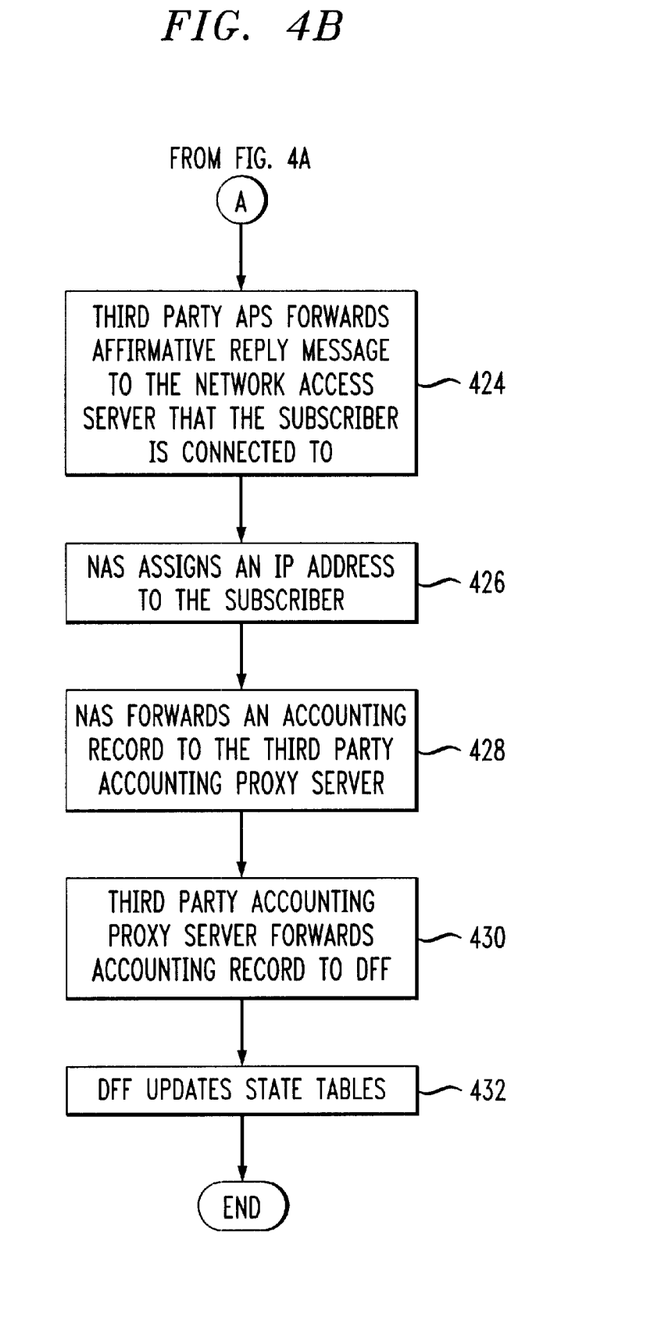
Figure 5:
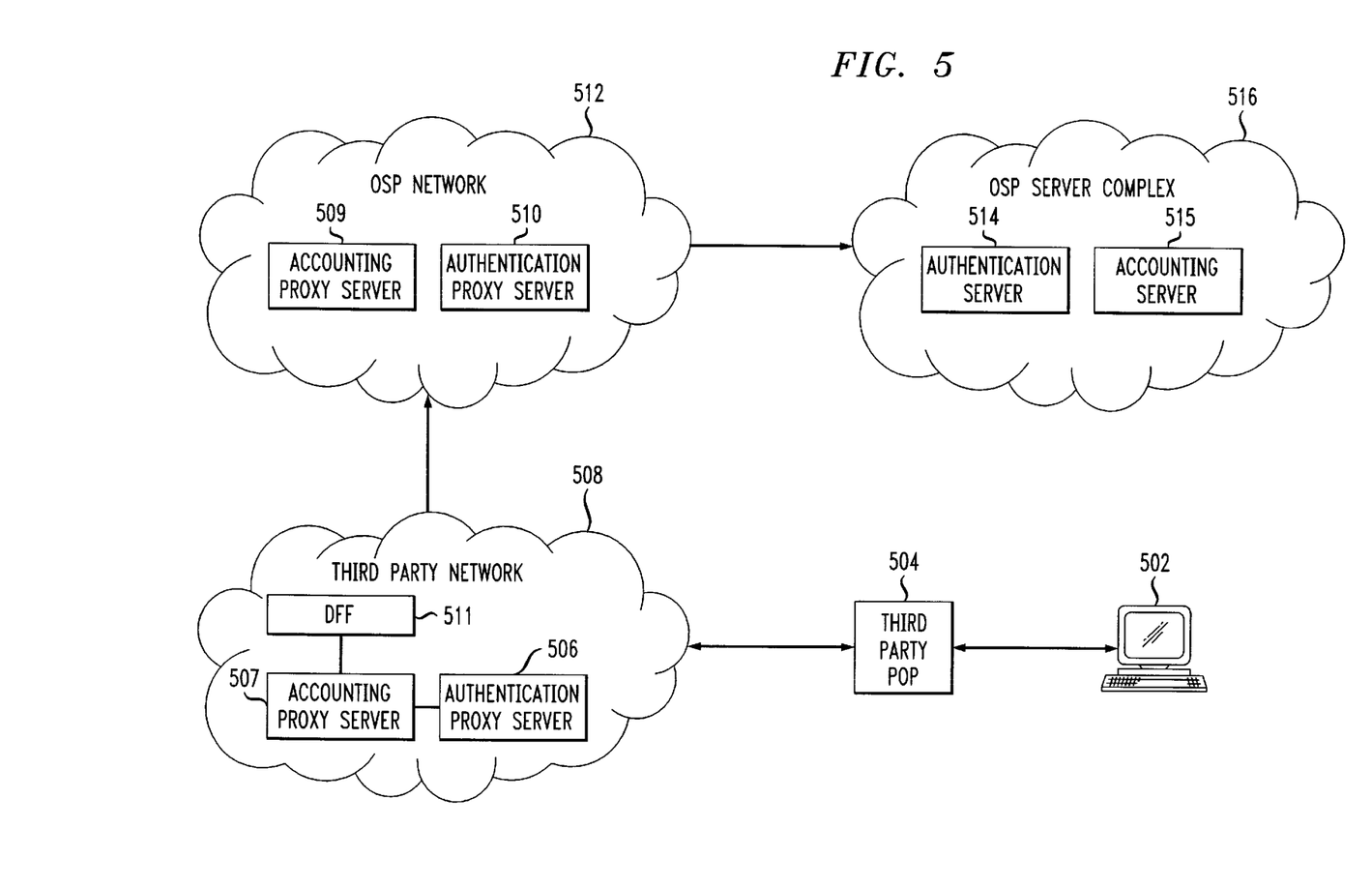
FIG. 5 is a simplified diagram of an exemplary system for performing the authentication-process set forth in FIGS. 4A and 4B.

The process of authenticating a user and maintaining the relevant information in the DFF is now explained in more detail. Referring to FIGS. 4A, 4B, and 5, an OSP subscriber dials into a third party POP 504 via his personal computer 502 (step 402). The third party POP 504 prompts the OSP subscriber for his user ID and password (step 404). The OSP subscriber then enters his user ID and password via his personal computer 502 (step 406). The third party POP 504 then sends an authentication request containing the received user ID and password to a third party authentication proxy server (APS) 506 (step 408). The third party APS 506 forwards the authentication request to an APS that corresponds with the domain name supplied with the subscriber's user ID (step 410). For example if the subscriber's ID was smith@att.net the domain name is att and the request would be forwarded to the AT&T APS. Likewise if the user ID was smith@aol.com the domain name is aol and the request would be forwarded to AOL. In the present example, the authentication request is forwarded to the OSP APS 510 located in the OSP backbone network 512. In one example of the present invention, the third party APS 506 sends a Remote Authentication Dial-In User Service (RADIUS) proxy message to the OSP network for authentication of the user ID and password. RADIUS messages use a standard dial access authentication protocol which may be used to authenticate the user ID and password and is described at http://www.livingston.com/marketing/whitepapers/radius paper.html which is incorporated by reference. It is to be understood by those skilled in the art that any dial access authentication protocol may be used to authenticate the user ID and password.

The OSP APS 510 forwards the authentication request to the target domain authentication server for processing (step 412). In the present example, the request is forwarded to the OSP authentication server 514. The OSP authentication server 514 checks the user ID and password received from the OSP APS 510 with its database (step 414). An accounting server 515 located in the OSP server complex 516 accumulates accounting start and stop records for each authenticated user.

If the user ID and password are found to be invalid, the OSP authentication server 514 sends a negative response indicating that the user ID and password are invalid to the third party Network Access Server (NAS) (not shown) which is contained within the third party POP 504. The OSP authentication server 514 may also send a request for the user ID and password to be re-entered by the subscriber (step 416). If an invalid user ID and password is received again, the user ID and password may be requested again for a total of n times. If a valid user ID and password are not received, the subscriber is denied access (step 420).

If the user ID and password are found to be valid, the OSP authentication server 514 sends an affirmative reply message to the third party APS 506 indicating that the subscriber has been authenticated (step 422). The third party APS 506 forwards the affirmative reply message to the network access server (NAS) from which the subscriber is connected which is located at the third party POP (step 424).

The third party NAS assigns an IP address to the subscriber (step 426). Upon validation by the OSP authentication server 514, an accounting record is established for the subscriber. The accounting record is used to memorialize data associated with the subscriber's online session and to calculate any costs associated with the session for which the subscriber is to be billed. The third party NAS sends the accounting record to a third party accounting proxy server 507 (step 428). The third party accounting proxy server 507 forwards the accounting record to the DFF 511 (step 430). The DFF 511 updates its state tables to reflect that the subscriber has been authenticated (step 432).

Figure 6A:
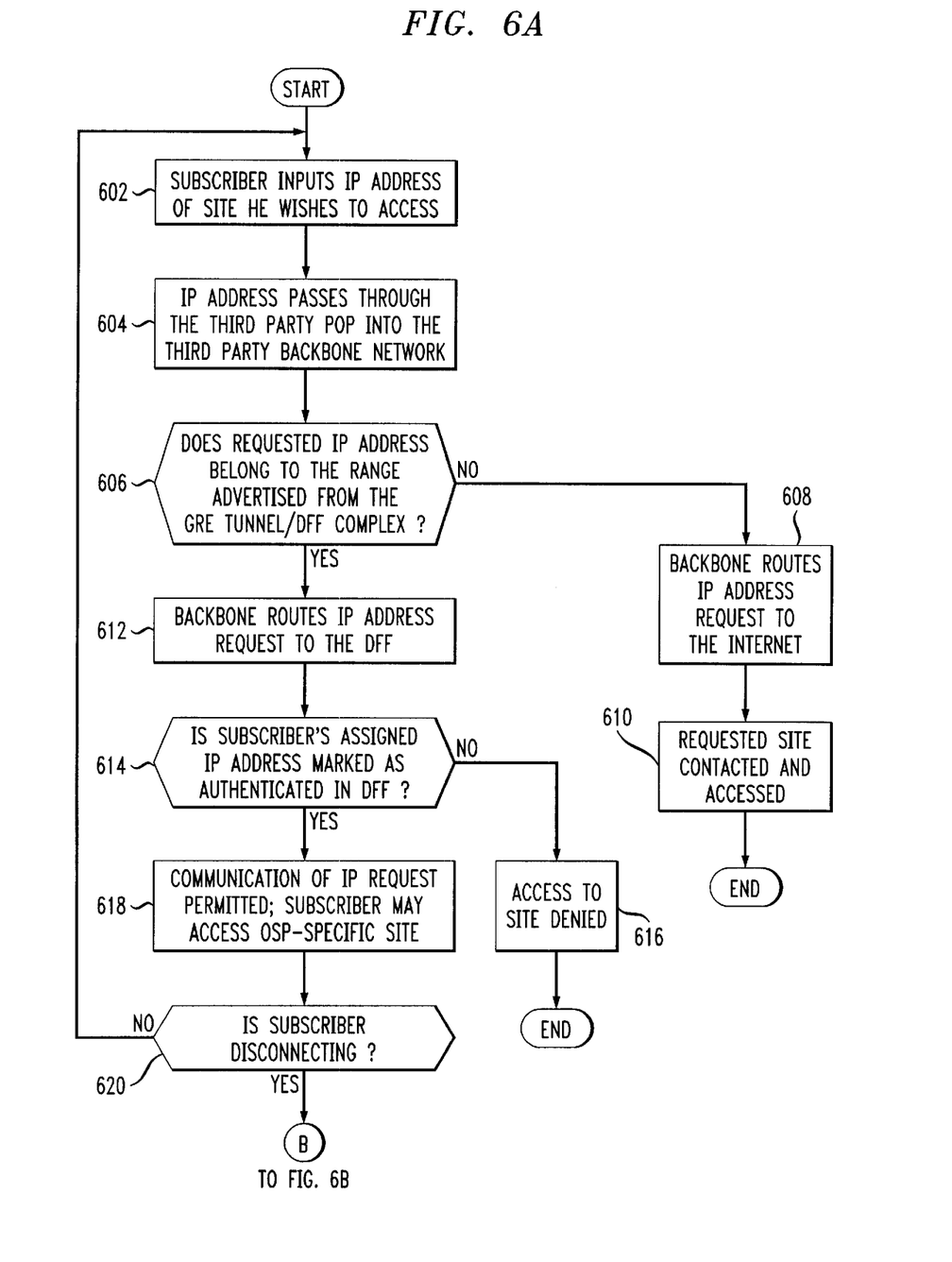
FIGS. 6A–6B illustrate a flow chart depicting a method for routing a subscriber request and accessing and administering a dynamic filtering firewall to maintain a list of such authorized users in accordance with the present invention.
Figure 6B:
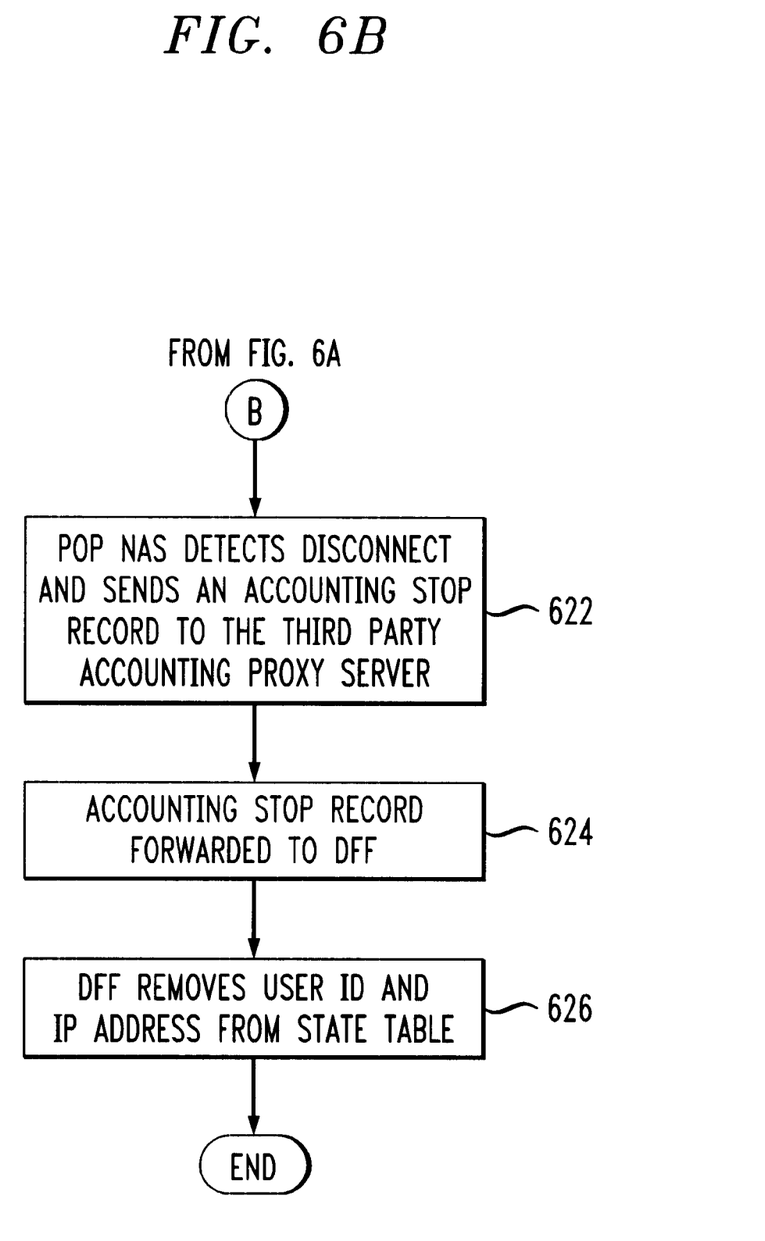

Once the subscriber has been authenticated by the OSP authentication server 514, the subscriber is IP packet flow is enabled between the subscriber's computer and the OSP's network. The process of routing requests from the subscriber and the corresponding filtering process that occurs when the subscriber requests access to OSP-specific services is now described in detail with reference to FIGS. 2 and 6. Once the subscriber has been authenticated, IP communication is enabled between the subscriber's computer 202 and both the Internet 224 and the OSP servers 222.

The subscriber enters an IP communication request for a site that he wishes to access (step 602). The IP communication request includes the address of the site and the subscriber's origination address. The IP address passes through the third party POP 206 into the third party backbone network (step 604). Next, it is determined whether the requested IP address belongs to the range advertised from the GRE tunnel/DFF complex (step 606). If the IP address does not belong to the range and is an Internet address, the third party backbone network routes the IP address request to the Internet 224 (step 608). The requested Internet site is contacted and accessed (step 610). For each additional Internet site that the subscriber may wish to access, a similar procedure is implemented.

If the IP address corresponds to an OSP-specific site, the third party backbone network routes the IP address request to the DFF 210 to determine if the subscriber has been authenticated (steps 612, 614). If the subscriber has not been authenticated and the DFF 210 does not have a record of the user ID and originating address then access to the OSP-specific site is denied (step 616). If the subscriber's user ID and originating address are contained in the DFF 210, then communication of the IP request is allowed and the subscriber may access the OSP-specific site (step 618).

The subscriber can continue to request IP addresses in this manner during his online session until the subscriber wishes to end his online session (steps 602–618). When the subscriber is ready to end his online session, the subscriber disconnects from the third party POP (step 620). The third party NAS detects the disconnect and sends an accounting stop record to the third party accounting proxy server (step 622). The accounting stop record is then forwarded to the DFF 210 (step 624). The DFF 210 removes the user ID and IP address from its state tables (step 626) and the subscriber is no longer able to access the OSP online services until he is re-authenticated.

In accordance with another embodiment of the present invention, the state tables contained in the DFF may be periodically updated. The third party POPs may periodically transmit summary lists of the active IP addresses which have been assigned by the third party and the corresponding user IDs. This list is compared to the lists of authenticated users contained in the state tables of the DFF. If there is a discrepancy between the two lists the state tables are corrected. For example, an authenticated user may log off and his IP address may be assigned to another user who is not a subscriber to the same OSP as the previous holder of the IP address. As such, the IP address should have been removed from the DFF state tables.

In accordance with another embodiment of the present invention, additional criteria may be used to determine if a subscriber may have access to OSP specific sites. For example, an OSP may provide various service packages such that a class of service must be identified to determine if a subscriber may access a particular OSP site. Such class of service designations may represent various grades of service such as, but not limited to, basic, premium and enhanced service subscriptions. A profile may be created by the OSP for each subscriber which includes the subscriber's ID, password, and permission levels with respect to what services the subscriber can access. The information transmitted to the state tables of the DFF for an authenticated subscriber under this scenario would include the customer profile which would be checked each time the subscriber tried to access an OSP-specific service.

Other criteria which could be used to determine access to OSP-specific services could include time limitations, activity by the subscriber and location (origination IP address) from which subscriber is attempting to access services.

In accordance with yet another embodiment of the present invention, multiple DFFs may be deployed in parallel. Multicast protocols may be used to keep each DFF up to date and synchronized to a consistent state of data content. Different service classes may be mapped to multicast IP addresses wherein a DFF that supports a particular service class will subscribe to a multicast IP address or family of addresses. Each DFF is considered to be part of a network infrastructure. As such, the DFF database size and restoration time are important network design criteria. To limit the size of the session mapping database and to minimize the time it takes to restore the database, the DFF actively communicates with the network routers to establish and control the number of subscriber source IP addresses that it must validate. Depending on the scope of usage, a large number of DFF units may be required.

While the present invention has been described in connection with the illustrated embodiments, it will be appreciated and understood that modifications may be made without departing from the true spirit and scope of the invention.

We claim:

1. A method of permitting a subscriber secure access to an online server complex operated by a particular online service provider (OSP), said subscriber seeking to access the online server complex via a Point of Presence which is operated by a party other than the OSP, the method comprising the steps of:

receiving an IP communication request comprised of a destination IP address and an origination IP address, said origination IP address corresponding to an IP address assigned to a subscriber's computer upon authentication of a subscriber's login information for a particular OSP, said origination IP address being one of a plurality of IP addresses which are shared among a plurality of OSPs and which are assigned to an authenticated subscriber upon successful login and which are unassigned when a subscriber logs off;

forwarding the IP communication request to a dynamic filtering firewall if the destination IP address corresponds to a service provided by the particular OSP;

comparing the origination IP address with one or more tables of stored authenticated IP addresses, each table comprising a list of currently authenticated IP addresses for a different particular OSP, each table being periodically updated to determine if the IP address is still authenticated by the particular OSP associated with a given table and to add authenticated IP addresses corresponding to recently logged on subscribers and to delete IP addresses corresponding to recently disconnected subscribers to a table associated with the particular OSP to which the subscriber has been authenticated ; and forwarding the IP communication request to the destination IP address if the origination IP address matches an IP address contained in the table, thereby indicating that the subscriber has authorized access to the online service complex.

2. The method of claim 1 wherein the table of stored authenticated IP addresses is comprised of a plurality of entries, each entry comprised of a user ID and an assigned IP address.

3. The method of claim 2 wherein each entry further comprises a subscriber profile.

4. The method of claim 3 wherein said comparing step further comprises the step of:

determining if said destination IP address corresponds to one or more services that the subscriber is permitted access based on the subscriber's profile.

5. The method of claim 1 further comprising the steps of:

determining if the received destination IP address corresponds to an Internet service;

forwarding the IP communication request to the Internet if the IP address corresponds to an Internet service.

6. A method of authenticating a subscriber for access to an online server complex operated by a particular online service provider (OSP), said subscriber seeking to access the online server complex via a Point of Presence which is operated by a party other than the OSP, said Point of Presence providing access to more than one OSP, the method comprising the steps of:

receiving a user ID and password for access to a particular OSP from the subscriber;

identifying the particular OSP based on the user ID;

forwarding the user ID and password to an OSP server;

receiving a message from the OSP server complex indicating whether the subscriber has been authenticated;

if authenticated, assigning the subscriber an IP address; and updating a table contained within a firewall operated by the party other than the OSP to include said user ID and assigned IP address, said IP address being one of a plurality of IP addresses which are shared among a plurality of OSPs and which are assigned to an authenticated subscriber upon successful login and which are unassigned when a subscriber logs off; said firewall containing one or more tables, each said table containing a list of currently authenticated user IDs and assigned IP addresses associated with a different particular OSP, each table being periodically updated to determine if the IP address is still authenticated by the particular OSP and to add authenticated IP addresses corresponding to recently logged on subscribers and to delete IP addresses corresponding to recently disconnected subscribers to the particular OSP.

* * * * *